United States Patent
Cooley et al.

(10) Patent No.: US 7,792,661 B1
(45) Date of Patent: Sep. 7, 2010

(54) REALTIME FEATURE ADAPTATION RESPONSIVE TO DYNAMICALLY GATHERED USABILITY INFORMATION

(75) Inventors: Shaun Cooley, El Segundo, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 5 days.

(21) Appl. No.: 11/674,972

(22) Filed: Feb. 14, 2007

(51) Int. Cl.
    *G06F 11/00* (2006.01)
(52) U.S. Cl. .................................................... 702/185
(58) Field of Classification Search ............. 702/68, 702/81, 90, 119–123, 182–186, 188; 714/39; 709/102; 707/100
See application file for complete search history.

(56) References Cited

U.S. PATENT DOCUMENTS

| | | | |
|---|---|---|---|
| 5,754,845 A * | 5/1998 | White | 707/10 |
| 2002/0178206 A1* | 11/2002 | Smith | 709/102 |
| 2003/0126151 A1* | 7/2003 | Jung | 707/100 |
| 2003/0140282 A1* | 7/2003 | Kaler et al. | 714/39 |
| 2007/0027652 A1* | 2/2007 | Hosagrahara | 702/182 |

* cited by examiner

*Primary Examiner*—Mohamed Charioui
(74) *Attorney, Agent, or Firm*—Brill Law Office; Jeffrey Brill

(57) ABSTRACT

Applications are instrumented to gather usability information. The gathered usability information is analyzed. This analysis can identify, for example, unused or infrequently used features, very frequently used features or features that users have trouble utilizing. Based on the analysis, determinations are made as to modifications to make to the applications. The modifications can be executed by the same instrumentation used to gather the usability data.

20 Claims, 2 Drawing Sheets

US 7,792,661 B1

REALTIME FEATURE ADAPTATION RESPONSIVE TO DYNAMICALLY GATHERED USABILITY INFORMATION

TECHNICAL FIELD

This invention pertains generally to updating software applications, and more specifically to adapting application features in realtime, based on dynamically gathered usability information.

BACKGROUND ART

The process of gathering feature usage data and then adapting software to address identified shortcomings in subsequent releases of an application takes so long that it is nearly useless. Users typically have to wait for service packs or brand new versions of software before they see identified problems addressed. Users would benefit greatly from a more timely and responsive feedback mechanism that resulted in timely updates that adapt the software to address usability shortcomings.

What is needed are methods, computer readable media and computer systems for adapting application features in realtime, based on usability dynamically gathered information.

SUMMARY

As users operate software programs, information concerning what features of the applications are actually used is dynamically gathered. Based on this gathered usage data, the applications are modified in realtime, so that users do not need to wait for new releases or updates in order to see identified problems fixed. More specifically, a gathering module captures usability data as programs are run and transmits the data to an analysis module. The analysis module analyzes the data, and determines things such as which user interface components and dialog options are and are not being used, and which software functionalities users have trouble operating. The analysis module determines modifications to make to the applications, and transmits this information to a modification module. The modification module updates the applications in realtime, for example through the use of dynamic instrumentation.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
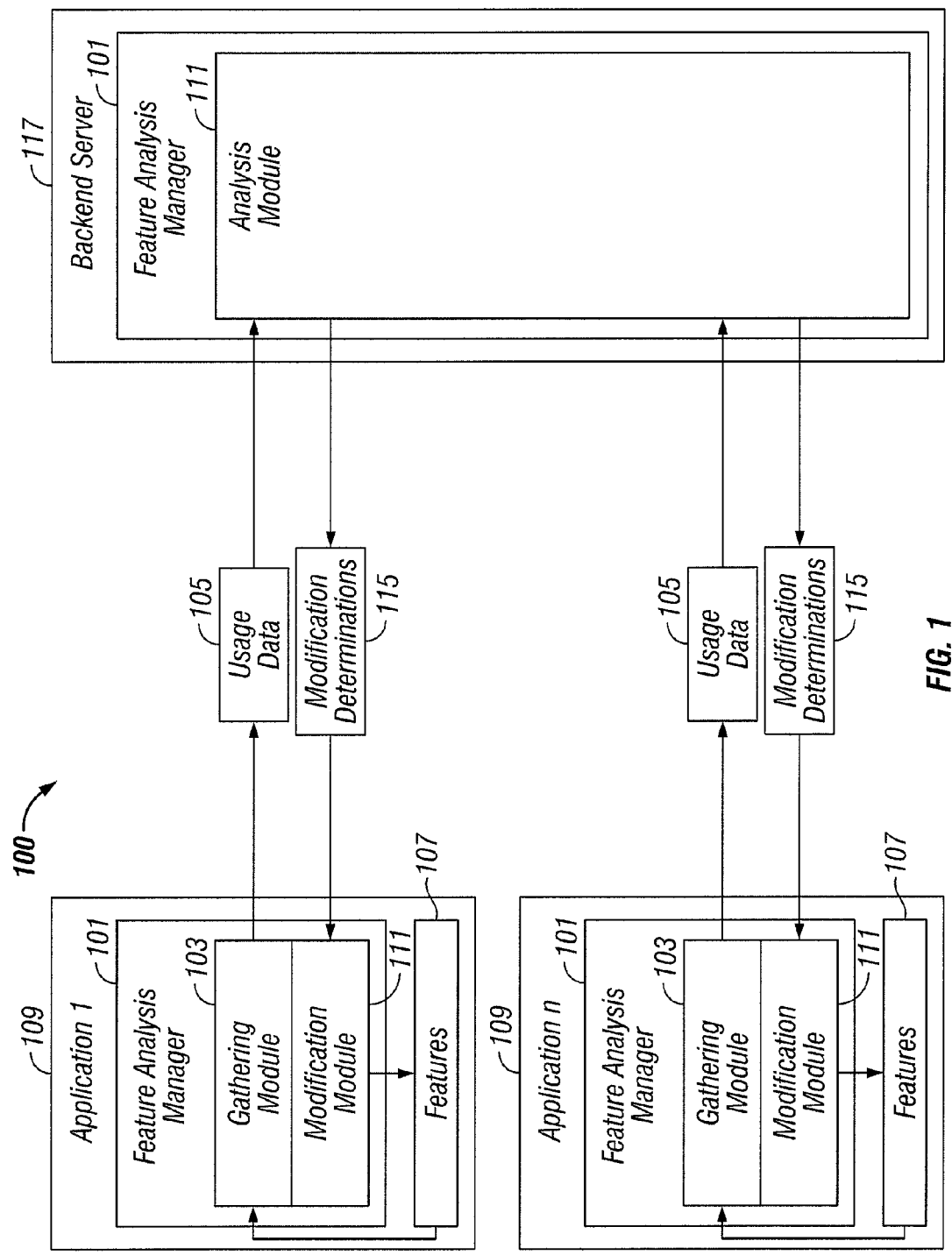
FIG. 1 is a block diagram illustrating a high level overview of a system for adapting application features in realtime based on dynamically gathered usability information, according to some embodiments of the present invention.

FIG. 1 illustrates a system 100 for adapting application features in realtime based on dynamically gathered usability information 105, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a feature analysis manager 101 includes a gathering module 103 for gathering usage data 105 concerning specific features 107 of applications 109, and a modification module 111 for modifying the applications 109, for example by adjusting the availability of features 107 being monitored. Gathered usage data 105 is transmitted to an analysis module 113 for processing. The analysis module 113 is also a component of feature analysis manager 101. The analysis module 113 makes determinations 115 as to modifications to be made to applications 109 from which usage data 105 has been gathered. The analysis module 113 transmits these modification determinations 115 to the modification module 111, which modifies the applications 109 accordingly.

In the embodiment illustrated in FIG. 1, the gathering module 103 and the modification module 111 are instantiated in the form of software instrumentation within applications 109 being modified, and the analysis module 113 is instantiated as software running on a backend server 117. It is to be understood that in other embodiments, some or all of this functionality can be distributed in other ways, and reside on a single computing device or on more and/or different computing devices as desired. It is to be understood that although FIG. 1 illustrates two applications 109 being monitored and updated, the present invention can be used in conjunction with any number of applications 109 and/or entire systems as desired.

The gathering module 103 can glean usage data 105 such as how frequently certain features 107 (e.g., user interface components or available functionalities) are accessed by users, which menu options are and are not selected by users and how long users spend performing various operations (e.g., the lengths of time users spend on a given dialog before selecting an option). As noted above, the gathering module 103 transmits this data 105 to the analysis module 113.

The analysis module 113 analyzes the received data 105 and determines features 107 and options that can be eliminated, simplified, or otherwise improved. For example, if two options are presented on a menu and one of those options is selected 100% of the time by all users, then the second option can be eliminated altogether. More generally, if a dialog contains, e.g., ten options but only, e.g., three of them are ever used with a desired level of regularity, then the unused (or infrequently used) options can be eliminated. If users are found to spend a lot of time determining which option to choose on a given dialog (or on another type of user interface element presenting choices), then that dialog can be reworked, for example by splitting it into multiple dialogs. It is to be understood that these are only examples of the types of analysis that can be performed, and the types of determinations 115 that can be reached. The specific analysis logic to apply and the specific criteria on which to make specific modification determinations 115 are variable design parameters.

Once the modification determinations 115 have been made, the analysis module 113 transmits the determinations 115 to the modification module 111 (e.g., running as instrumentation at an application 109 level, as illustrated). The modification module 111 then makes the corresponding modifications 115 to the application 109, for example by suppressing eliminated features 107. As will be understood by those of ordinary skill in the relevant art, the instrumentation to allow for significant dynamic changes can be flexibly implemented with data driven user interface specifications such as Hypertext Markup Language ("HTML"), or within the context of more static user interface models, such as traditional Microsoft Windows® programming, which also supports dynamic instrumentation. The implementation mechanics of implementing such dynamic instrumentation is known to those of ordinary skill in the relevant art, and its use within the context of the present invention will be readily apparent to those of such a skill level in light of this specification.

Figure 2:
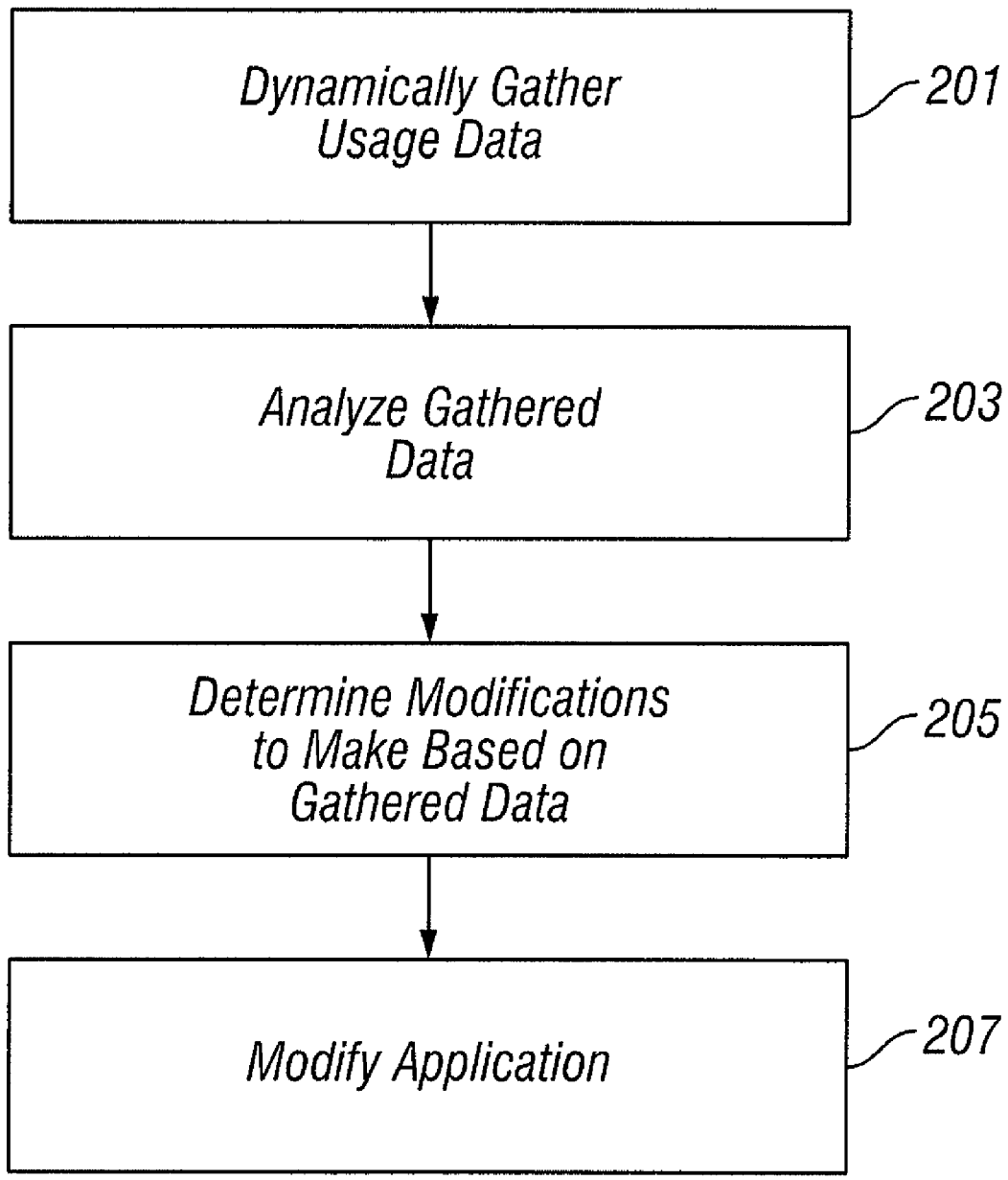
FIG. 2 is a flowchart illustrating steps for adapting application features in realtime based on dynamically gathered usability information, according to some embodiments of the present invention.

FIG. 2 is a flowchart illustrating steps for adapting application features in realtime, based on dynamically gathered usability information, according to some embodiments of the present invention. The gathering module dynamically gathers 201 information 105 concerning usage of application 109 features 107. As noted above, in some embodiments the gathering module 103 comprises instrumentation associated with the application 109 in question, whereas in other embodiments the gathering module 103 can comprise other instantiations of application monitoring functionality, for example software running as an integral part of the feature analysis manager 101 running on a backend server 117. Therefore, in some embodiments, the analysis module 113 receives the usability information 105 from an external source running on another computing device. In other embodiments the information 105 is gathered 201 by a process running on the same computing device (e.g., a backend server 117) as the analysis module 113, wherein this process monitors execution of the application 109 as it is being used.

The gathering module 103 can gather 201 application usability data 105 such as information 105 concerning which user interface components are accessed by users, information 105 concerning frequencies with which user interface components are accessed by users, information 105 concerning which options associated with user interface components are selected by users, information 105 concerning frequencies with such options are selected by users and information 105 concerning lengths of time users spend performing various operations while using the application 109. Of course, these are only examples of the type of data 105 that can be gathered 201.

The analysis module 109 analyzes 203 the gathered information 105. Responsive to results of the analysis, the analysis module 109 determines 205 modifications 115 to make to the application 109. This can comprise, for example, determining 205 components (e.g., user interface components, user interface selectable options and/or program functionalities) to eliminate from the application 109, add to the application 109, or simplify.

Responsive to the determinations 115 made by the analysis module 113, the modification module 111 modifies 207 the application 109 in realtime. As noted above, in some embodiments, the modification module 111 comprises instrumentation associated with the application 109 in question, whereas in other embodiments the modification module 111 can comprise other instantiations of application modifying functionality, for example software running as an integral part of the feature analysis manager 101 running on a backend server 117. Therefore, in some embodiments, the analysis module 113 sends the usability information 105 to an external source running on another computing device, and in other embodiments the modifications are made 207 by a process running on the same computing device as the analysis module 113.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for adapting application features in realtime, based on dynamically gathered usability information, the method comprising the steps of:
   using at least one microprocessor, dynamically, while an application runs, gathering data concerning how specific features of the application are used;
   using the at least one microprocessor, analyzing the gathered data concerning how the specific features of the application are used;
   using the at least one microprocessor, determining modifications to make to specific features of the application, based on analysis of the gathered data concerning how specific features of the application are used; and
   using the at least one microprocessor, modifying the application in realtime without providing a new release of the application and without providing an update to the application, such that make the determined modifications are made to the specific features of the application automatically by the at least one microprocessor, without human interaction.

2. The method of claim 1 wherein using the at least one microprocessor, determining modifications to make to specific features of the application, based on analysis of the gathered data concerning how specific features of the application are used further comprises executing at least one step from a group of steps consisting of:
    using the at least one microprocessor, determining components to eliminate from the application;
    using the at least one microprocessor, determining components to add to the application; and
    using the at least one microprocessor, determining components of the application to simplify.

3. The method of claim 2 wherein components further comprise at least one item from a group consisting of:
    user interface components;
    selectable options associated with a user interface component; and
    program functionalities.

4. The method of claim 1 wherein using the at least one microprocessor, dynamically, while an application runs, gathering data concerning how specific features of the application are used further comprises executing at least one step from a group of steps consisting of:
    using the at least one microprocessor, receiving gathered information from instrumentation associated with the application;
    using the at least one microprocessor, receiving gathered information from an external source, the received information resulting from the external source monitoring execution of the application as it is being used; and
    using the at least one microprocessor, monitoring execution of the application as it is being used.

5. The method of claim 1 wherein using the at least one microprocessor, dynamically, while an application runs, gathering data concerning how specific features of the application are used further comprises executing at least one step from a group of steps consisting of:
    using the at least one microprocessor, gathering information concerning which user interface components of the application are accessed by users;
    using the at least one microprocessor, gathering information concerning frequencies with which user interface components of the application are accessed by users;
    using the at least one microprocessor, gathering information concerning which options associated with a user interface component of the application are selected by users;
    using the at least one microprocessor, gathering information concerning frequencies with which options associated with a user interface component of the application are selected by users; and
    using the at least one microprocessor, gathering information concerning lengths of time users spend performing operations while using the application.

6. The method of claim 1 wherein using the at least one microprocessor, modifying the application in realtime without providing a new release of the application and without providing an update to the application, such that the determined modifications are made to the specific features of the application automatically by the at least one microprocessor, without human interaction further comprises:
    using the at least one microprocessor, executing at least one step from a group of steps consisting of:
        using the at least one microprocessor, sending information concerning modifications to make to instrumentation associated with the application;
        using the at least one microprocessor, sending information concerning modifications to make to the application to an external destination; and
        using the at least one microprocessor, directly modifying the application.

7. The method of claim 1 further comprising:
    using the at least one microprocessor, associating with at least one application instrumentation for gathering usability information and making application modifications.

8. At least one non-transitory computer readable medium containing a computer program product for adapting application features in realtime, based on dynamically gathered usability information, computer program product comprising:
    program code for dynamically, while an application runs, gathering data concerning how specific features of the application are used;
    program code for analyzing the gathered data concerning how the specific features of the application are used;
    program code for, determining modifications to make to specific features of the application, based on analysis of the gathered data concerning how specific features of the application are used; and
    program code modifying the application in realtime without providing a new release of the application and without providing an update to the application, such that the determined modifications are made to the specific features of the application automatically, without human interaction.

9. The at least one non-transitory computer readable medium according to claim 8 wherein the program code for determining modifications to make to specific features of the application, based on analysis of the gathered data concerning how specific features of the application are used further comprises program code for executing at least one step from a group of steps consisting of:
    determining components to eliminate from the application;
    determining components to add to the application; and
    determining components of the application to simplify.

10. The at least one non-transitory computer readable medium according to claim 9 wherein components further comprise at least one item from a group consisting of:
    user interface components;
    selectable options associated with a user interface component; and
    program functionalities.

11. The at least one non-transitory computer readable medium according to claim 8 wherein the program code for dynamically, while an application runs, gathering data concerning how specific features of the application are used further comprises program code for executing at least one step from a group of steps consisting of:
    receiving gathered information from instrumentation associated with the application;
    receiving gathered information from an external source, the received information resulting from the external source monitoring execution of the application as it is being used; and
    monitoring execution of the application as it is being used.

12. The at least one non-transitory computer readable medium according to claim 8 wherein the program code for dynamically, while an application runs, gathering data concerning how specific features of the application are used further comprises program code for executing at least one step from a group of steps consisting of:
    gathering information concerning which user interface components of the application are accessed by users;
    gathering information concerning frequencies with which user interface components of the application are accessed by users;
    gathering information concerning which options associated with a user interface component of the application are selected by users;

gathering information concerning frequencies with which options associated with a user interface component of the application are selected by users; and gathering information concerning lengths of time users spend performing operations while using the application.

13. The at least one non-transitory computer readable medium according to claim 8 wherein the program code for modifying the application in realtime without providing a new release of the application and without providing an update to the application, such that the determined modifications are made to the specific features of the application automatically, without human interaction further comprises program code for executing at least one step from a group of steps consisting of:

sending information concerning modifications to make to instrumentation associated with the application;

sending information concerning modifications to make to the application to an external destination; and directly modifying the application.

14. The at least one non-transitory computer readable medium according to claim 8 further comprising:

program code for associating with at least one application instrumentation for gathering usability information and making application modifications.

15. A computer system for adapting application features in realtime, based on dynamically gathered usability information, the computer system comprising:

at least one microprocessor;

computer memory;

means for dynamically, while an application runs, gathering data concerning how specific features of the application are used;

means for analyzing the gathered data concerning how the specific features of the application are used;

means for, determining modifications to make to specific features of the application, based on analysis of the gathered data concerning how specific features of the application are used; and means modifying the application in realtime without providing a new release of the application and without providing an update to the application, such that the determined modifications are made to the specific features of the application automatically, without human interaction.

16. The computer system of claim 15 wherein the means for dynamically, while an application runs, gathering data concerning how specific features of the application are used further comprise means for executing at least one step from a group of steps consisting of:

receiving gathered information from instrumentation associated with the application;

receiving gathered information from an external source, the received information resulting from the external source monitoring execution of the application as it is being used; and monitoring execution of the application as it is being used.

17. The computer system of claim 15 wherein the means for dynamically, while an application runs, gathering data concerning how specific features of the application are used further comprise means for executing at least one step from a group of steps consisting of:

gathering information concerning which user interface components of the application are accessed by users;

gathering information concerning frequencies with which user interface components of the application are accessed by users;

gathering information concerning which options associated with a user interface component of the application are selected by users;

gathering information concerning frequencies with which options associated with a user interface component of the application are selected by users; and gathering information concerning lengths of time users spend performing operations while using the application.

18. The computer system of claim 15 wherein the means for determining modifications to make to specific features of the application, based on analysis of the gathered data concerning how specific features of the application are used further comprise means for executing at least one step from a group of steps consisting of:

determining components to eliminate from the application;

determining components to add to the application; and determining components of the application to simplify.

19. The computer system of claim 15 wherein the means for modifying the application in realtime without providing a new release of the application and without providing an update to the application, such that the determined modifications are made to the specific features of the application automatically, without human interaction further comprise means for executing at least one step from a group of steps consisting of:

sending information concerning modifications to make to instrumentation associated with the application;

sending information concerning modifications to make to the application to an external destination; and directly modifying the application.

20. The computer system of claim 15 further comprising:

means for associating with at least one application instrumentation for gathering usability information and making application modifications.

* * * * *

UNITED STATES PATENT AND TRADEMARK OFFICE
CERTIFICATE OF CORRECTION

| | |
|---|---|
| PATENT NO. | : 7,792,661 B1 |
| APPLICATION NO. | : 11/674972 |
| DATED | : September 7, 2010 |
| INVENTOR(S) | : Shaun Cooley and Bruce McCorkendale |

It is certified that error appears in the above-identified patent and that said Letters Patent is hereby corrected as shown below:

Claim 1, col. 4, line 62, replace "cation, such that make the determined modifications are"

with -- cation, such that the determined modifications are --

Signed and Sealed this

Ninth Day of November, 2010

David J. Kappos
*Director of the United States Patent and Trademark Office*